UNITED STATES PATENT OFFICE.

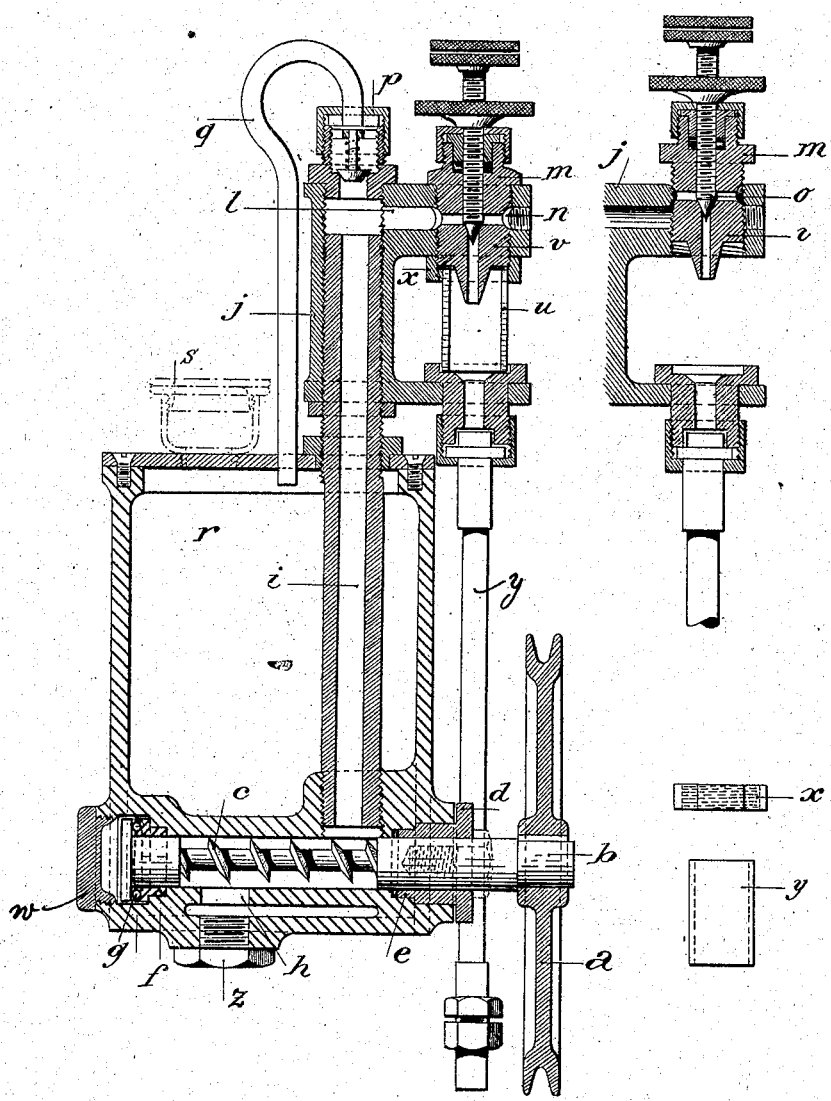

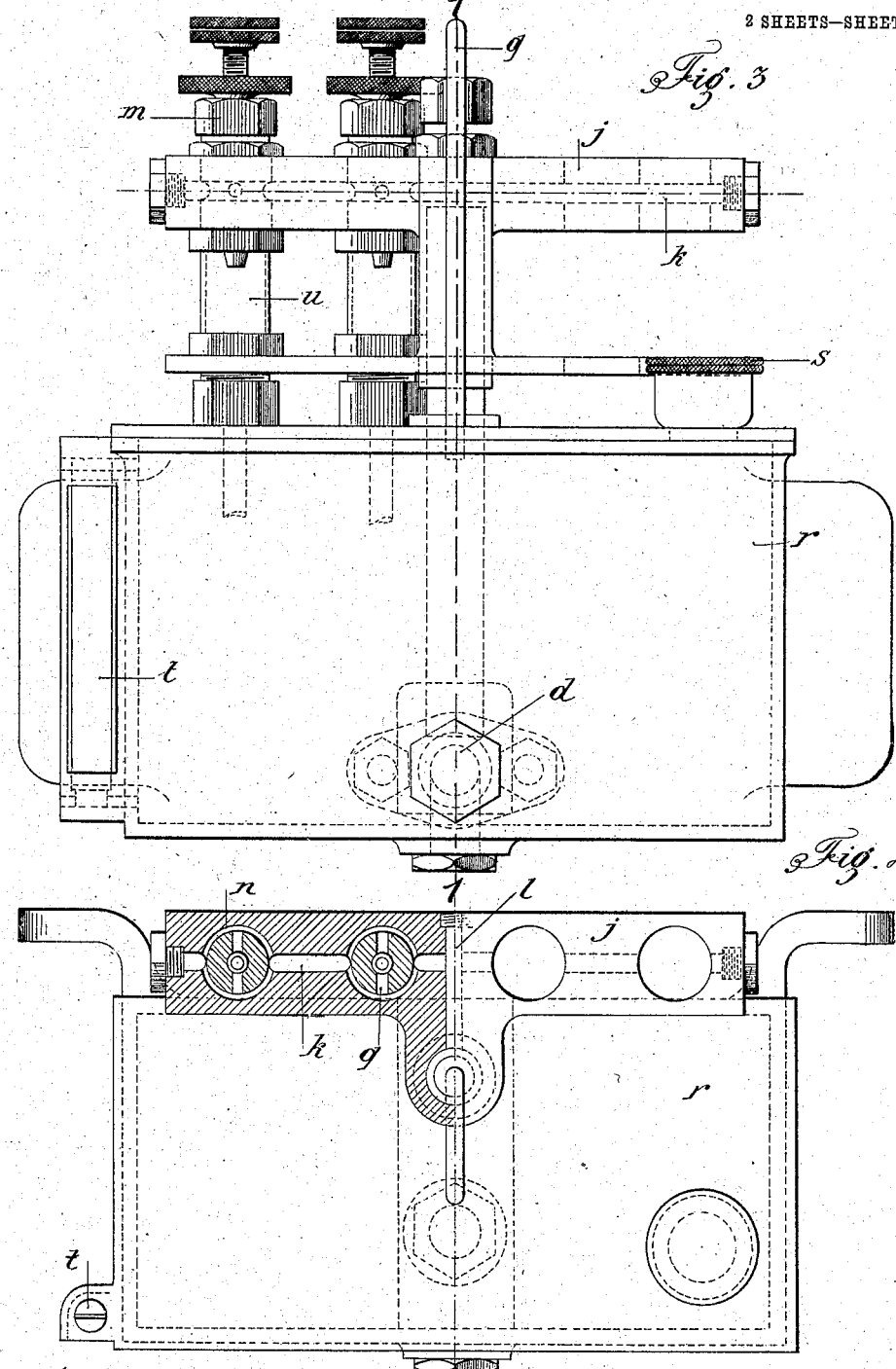

MAURICE BRIET, OF PARIS, FRANCE.

MECHANICAL LUBRICATOR.

No. 815,508.            Specification of Letters Patent.          Patented March 20, 1906.

Application filed January 12, 1904. Serial No. 138,725.

*To all whom it may concern:*

Be it known that I, MAURICE BRIET, a citizen of the French Republic, residing at 57 Rue Damrémont, in the city of Paris, France, have invented certain new and useful Improvements in Mechanical Lubricators with Archimedean Screw and Pressure-Controller, of which the following is a full, clear, and exact specification.

The present invention relates to a mechanical lubricator with Archimedean screw which is adapted to lubricate all the parts of a driving-machine or other apparatus to be oiled under pressure, as well as without pressure.

A lubricator of this class is illustrated in the annexed drawings, in which—

Figure 1 is a vertical section along line 1 1, Figs. 3 and 4; Fig. 2, a sectional detail view; Fig. 3, a front elevation, and Fig. 4 a plan view showing a part with the oil-channels in section.

Motion is imparted to the mechanism preferably by a pulley $a$, a gear-wheel, or the like keyed on the outer end of a solid cylindrical shaft $b$ with an enlarged head or collar at the other end, said shaft having an Archimedean screw $c$ between the ends, which may be worked out of the metal of the shaft or which can be made separately and then be inserted and secured between the two cylindrical pieces forming the ends of the shaft. The said shaft passes through an ordinary stuffing-box $d$ $e$ into a cylindrical bore or space in a casting integral with an oil-receptacle $r$. The part of the casting with said bore or cylinder is situated in the middle of the oil-tank slightly above its bottom. The bore communicates with the bottom of the oil-tank through a port $h$, as shown in Fig. 1. The foot end of the shaft turns in a suitable bearing $f$, inserted in the bore for the Archimedean screw. The bearing $f$ may be provided with ball race or groove adapted to receive balls $g$, so that a smooth friction is produced. Then the head at the foot end of the shaft $b$ is pressed against it, reducing the wear and tear of the shaft. The shaft $b$ is inserted through a suitable opening, which is then closed tightly by a screw-plug $w$, whereupon the stuffing-box $d$ is tightened and the pulley $a$ is secured on the outward-projecting end of shaft $b$. The oil is carried along by threads of the screw $c$ toward one end of the surrounding space when the shaft $b$ revolves and is pressed into a tube $i$, ascending through the reservoir $r$ and carrying at its upper part a support $j$, supporting a number of drop-nozzles $m$. These nozzles are secured in vertical openings having female thread $v$, and a longitudinal channel $k$, extending from one end to the other in the support, Figs. 3 and 4, connects said screw-openings, and a cross-channel $l$ at the same height as channel $k$ connects these openings with the upper part of the tube $i$. Each drop-nozzle $m$ has an annular groove $n$, Figs. 1, 2, and 3, and a transverse channel $o$, which can be closed more or less by a needle-valve $o'$ of ordinary construction. When the point of said valve is screwed home, the oil in the channel $o$ cannot pass downward into the vertical bore to feed the parts to be oiled; but the communication from the pipe $i$ through channel $l$, the annular grooves $n$, and channel $k$ remains open, so that all nozzles are supplied with oil, and only those having the channel $o$ open more or less by the needle-valves allow oil to drop down for lubricating.

A pressure-controller $p$ is arranged in the upper part of the apparatus, so that as soon as the lubricator is operating the air and the excess of oil escape and return to the receptacle $r$ through the overflow-pipe $q$.

To charge the apparatus, a stopper $s$ is removed. A glass tube $t$ is used to show the contents of the reservoir $r$. $u$ is a glass tube inserted between the lower end of each nozzle and the upper end of a supply-pipe $y$ which leads the oil to the parts to be lubricated.

Figs. 1 and 2 illustrate how the glass tube $u$ may be inserted and taken out.

The nozzle $m$ need only be unscrewed till the lower part of the body recedes in the threading $v$ far enough to close up the channel $l$ and $l$, the longitudinal channel $k$, Fig. 2. The nut $x$, holding the glass, is unscrewed at the same time, and the glass when broken can be removed to be replaced by a new one, and thereafter the parts are screwed up again in such a manner that the glass tube is jammed in, and the nut $x$ is screwed in place, as illustrated in Fig. 1.

The apparatus operates in the following manner: The screw $c$ presses the oil of the reservoir $r$ upwardly in the stand-pipe $i$, as described, and the channels $l$ and $k$ convey it to all the nozzles $m$, keeping the cross-channels $o$ filled. Any of the needle-valves may be opened more or less, and the oil will drop from their channels $o$ vertically down into the pipes $y$, and the flow can be readily examined through the glass tubes $u$, so that the operator may regulate the flow according to necessity by screwing the needle-valve $o'$ more or less against its seat.

A plug $z$ is provided under the apparatus for cleaning the same.

Having thus described my invention, what I claim as new is—

1. In a mechanical lubricator an oil-reservoir, a cylinder near the bottom of the same, and in communication therewith an Archimedean screw revolubly journaled in said cylinder and driven by the machine, a stand-pipe $i$ and a support $j$ carried thereby at its upper end, a delivery-nozzle screwed into said support $j$, a needle-valve adapted to open and close said nozzle, an oil-pipe $y$ leading to the parts to be lubricated and a glass tube $u$ inserted between said nozzle and said oil-pipe, substantially as described.

2. In a mechanical lubricator an oil-reservoir, a cylinder near the bottom of the same, and in communication therewith, an Archimedean screw revolubly journaled in said cylinder and driven by the machine, a stand-pipe $i$ and a support $j$ carried thereby at its upper end, a pressure-valve $p$ in said support above the stand-pipe $i$ and an overflow-pipe $q$ for the excess of oil, a delivery-nozzle screwed into said support $j$, a needle-valve adapted to open and close said nozzle an oil-pipe $y$ leading to the parts to be lubricated and a glass tube $u$ inserted between said nozzle and said oil-pipe substantially as described.

3. In a mechanical lubricator an oil-reservoir, a cylinder near the bottom of the same, and in communication therewith, an Archimedean screw revolubly journaled in said cylinder and driven by the machine, a stand-pipe $i$ and a support $j$ carried thereby at its upper end, a number of delivery-nozzles, screwed into vertical openings of the support and comprising annular grooves $n$, said support having longitudinal channels $k$ between the individual nozzles in communication with the stand-pipe $i$ by said annular grooves and a channel $l$, needle-valves adapted to open and close said nozzles, oil-pipes $y$ leading to the parts to be lubricated and glass tubes $u$ inserted between said nozzles and said oil-pipes substantially as described.

In witness whereof I have hereunto set my hand in presence of two witnesses.

MAURICE BRIET.

Witnesses:
ETORME BIDOLET,
GEORGE RIGOT.